US007178000B1

(12) United States Patent
Dobecki

(10) Patent No.: US 7,178,000 B1
(45) Date of Patent: Feb. 13, 2007

(54) TRACE BUFFER FOR DDR MEMORIES

(75) Inventor: Krzysztof Dobecki, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 404 days.

(21) Appl. No.: 10/803,377

(22) Filed: Mar. 18, 2004

(51) Int. Cl.
*G06F 12/00* (2006.01)

(52) U.S. Cl. .................. 711/168; 711/149; 711/131

(58) Field of Classification Search ............ 711/168, 711/149, 167, 131
See application file for complete search history.

(56) References Cited

U.S. PATENT DOCUMENTS 6,216,205 B1 * 4/2001 Chin et al. .................. 71/131

2003/0023823 A1 * 1/2003 Woo et al. .................. 711/167
2004/0068614 A1 * 4/2004 Rosenbluth et al. ........ 711/133

* cited by examiner

*Primary Examiner*—Brian R. Peugh

(57) ABSTRACT

A system for storing and retrieving data provided by the system on a system bus in a sequence at a predetermined system data rate. The system includes a system memory controller for enabling a system memory to store and retrieve the data at a rate twice the system data rate. Also provided is a trace buffer having a dual port random access memory. A trace buffer control system is provided for enabling the data on the system bus and fed concurrently to a pair of data ports of the dual port random access memory to be stored in the dual port random access memory at the predetermined system data rate and for enabling such dual port random access memory stored data to be retrieved from the dual port random access memory in the same sequence as such data was provided on the system data bus.

3 Claims, 3 Drawing Sheets

FIG. 3

| DUAL PORT RAM (DPR) | |
|---|---|
| ADDRESS LOCATION | DATA |
| $A_x$ | READ DATA_1 |
| $A_{x+1}$ | WRITE DATA_2 |
| $A_{x+2}$ | READ DATA_3 |
| $A_{x+3}$ | WRITE DATA_4 |

TRACE BUFFER FOR DDR MEMORIES

TECHNICAL FIELD

This invention relates to trace buffers and more particularly to trace buffers adapted to operate with Double Data Rate (DDR) memories.

BACKGROUND

As is known in the art, trace buffers are used to record activity on, for example, a system bus. For example, in a system where a CPU is coupled to a memory (e.g., a RAM) through a CPU bus, the trace buffer may be used to record activity of the CPU bus. More particularly, for each bus cycle, the digital word on the bus produced by the CPU may be recorded and stored in the trace buffer for later analysis in detecting and evaluating faults which may be produced by the CPU. The trace buffer may store the address, data, and control/status signals active for each bus cycle. One such trace buffer is described in my U.S. Pat. No. 6,611,879 issued Aug. 26, 20003 entitled "Data Storage System Having Separate Data Transfer Section and Message Network with Trace Buffer" assigned to the same assignee as the present invention. As is also known in the art, double data rate (DDR) memories are being used to increase the performance of data storage and other data systems. Thus, it would be desirable to provide a trace buffer system for use with a DDR Memory.

SUMMARY

In accordance with the present invention, a system is provided for storing and retrieving data provided by the system on a system bus in a sequence at a predetermined system data rate. The system includes a system memory controller for enabling a system memory to store and retrieve the data at a rate twice the system data rate. Also provided is a trace buffer having a dual port random access memory. A trace buffer control system is provided for enabling the data on the system bus and fed concurrently to a pair of data ports of the dual port random access memory to be stored in the dual port random access memory at the predetermined system clock rate.

In accordance with another feature of the invention, the system bus has a read section for the data retrieved from the system memory and a write section for data to be stored in the system memory. The read section is coupled to one of the pair of data ports and the write section is coupled to the other one of the pair of data ports.

In accordance with still another feature of the invention, the trace buffer control system enables such dual port random access memory stored data to be retrieved from the dual port random access memory in the same sequence as such data was provided on the system data bus.

In one embodiment, the system memory coupled to a memory data bus. The memory data bus is coupled to the system bus through a synchronizer. The system memory is adapted to store therein write data words provided on the memory data bus, or have read data words previously stored therein read therefrom and provided on the memory data bus. The read data words and the write data words being provided on the memory bus at a rate twice a predetermined system clock rate. The synchronizer enables the read data words and such write data words to be provided on the system bus in a sequence at the system clock rate. The system includes a trace buffer having a dual port random access memory. The dual port random access memory has a pair of data ports. The dual port random access memory is adapted to store two of the read and write data words from the system data bus fed concurrently to the pair of data ports at two different locations in the dual port random access memory for storage therein at the predetermined system clock rate. The trace buffer control system couples read data words from the system data bus to one of the pair of ports and couples write data words on the system data bus to the other one of the pair of ports, such read data words and such write data words being retrievable from the dual port random access memory in the same sequence as such read data words and write data words were provided on the system data bus and memory data bus.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a table showing the memory location of data stored in a trace buffer section of the system of FIG. 1.

Like reference symbols in the various drawings indicate like elements.

DETAILED DESCRIPTION

Figure 1:
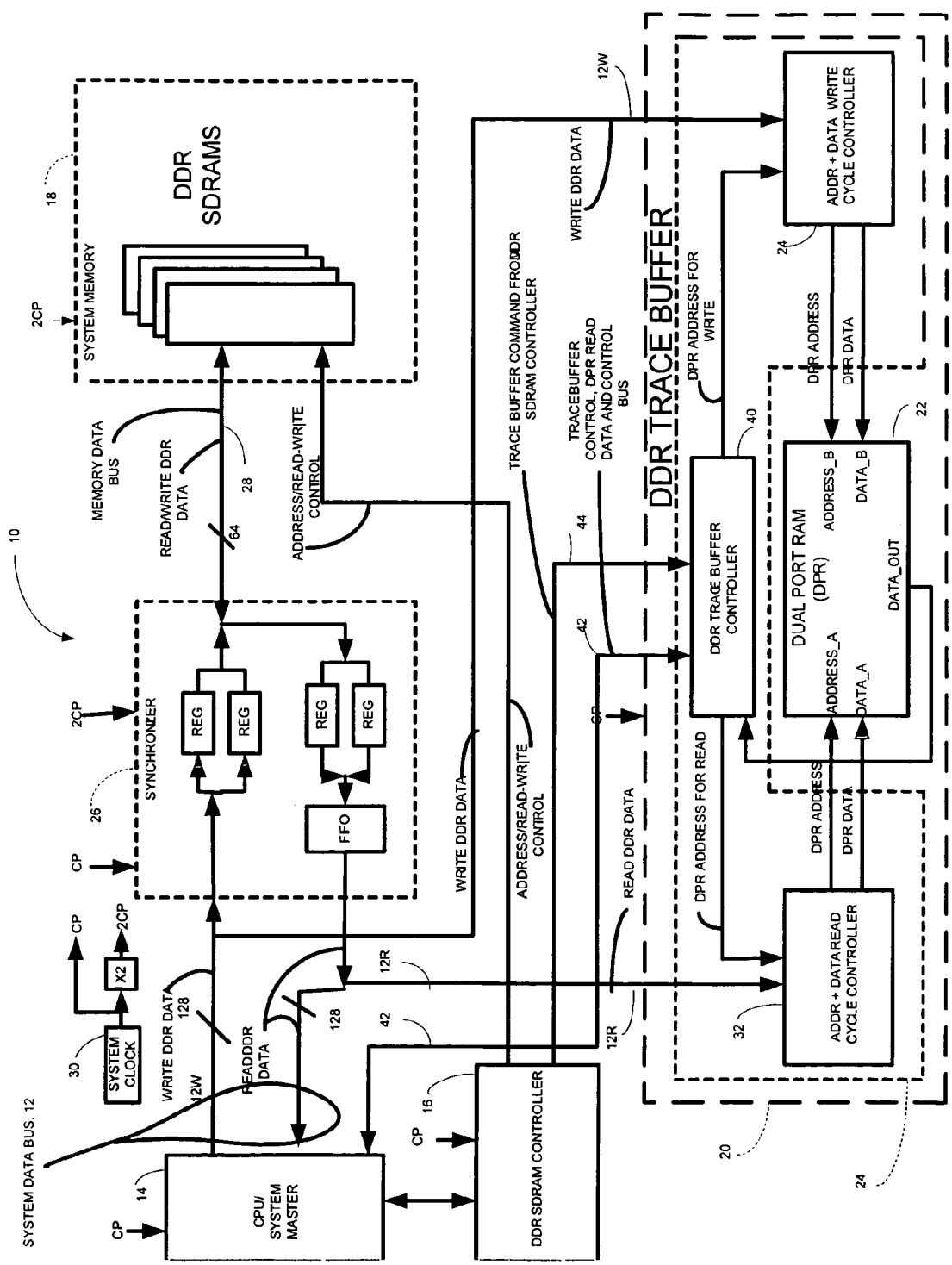
FIG. 1 is a block diagram of a data system according to the invention.

Referring now to FIG. 1, a data system 10 is shown for storing and retrieving data provided by the system on a system data bus 12 by a CPU/system master 14 in a sequence at a predetermined system data rate, CP. The system 10 includes a system memory controller 16 for enabling a system memory 18 to store and retrieve the data at a rate twice the system data rate. Here, the system memory 18 is a DDR SDRAM and the system memory controller 16 is a DDR SDRAM controller. The system memory controller 16 provides address/read/write/activate/precharge/refresh control signals to the system memory 18 in any conventional manner.

Also provided is a trace buffer section 20 having a dual port random access memory, DPR 22. A trace buffer control system 24 is provided for enabling the data on the system bus 12 and fed concurrently to a pair of data ports DATA_A, DATA_B, of the dual port random access memory 22 to be stored in the dual port random access memory 22 at the predetermined system data rate CP and for enabling such dual port random access memory stored data to be retrieved from the dual port random access memory at output DATA_OUT in the same sequence as such data was provided on the system data bus 12. More particularly, the system data bus 12 has a read section 12R for the data retrieved from the system memory 18 and a write section 12W for data to be stored in the system memory 18. The read section 12R is coupled to one of the pair of data ports, here port DATA_A and the write section 12W is coupled to the other one of the pair of data ports, here port DATA_B.

Figure 2:
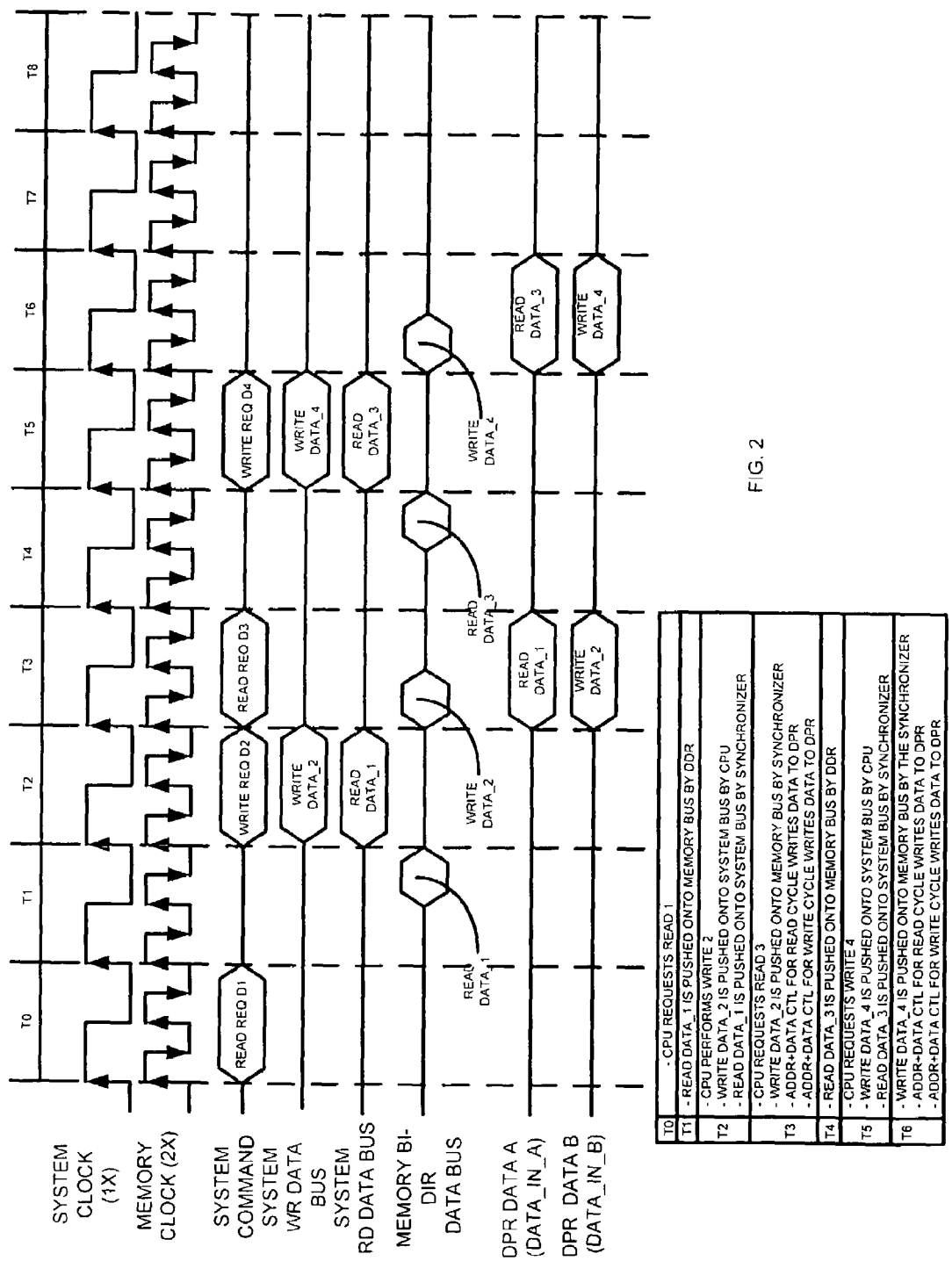
FIG. 2 are timing diagrams showing operation of the system of FIG. 1 in executing an example.

More particularly, the system memory 18 is coupled to the CPU/system master 14 through the memory data bus 12 and a synchronizer 26. The system memory 18 is adapted to store therein write data words provided on a memory data bus 28, or have read data words stored therein read therefrom provided on the memory data bus 28. The system memory 18 is adapted to store the write data words provided on the memory data bus 28 and to provide the read data words on the memory data bus 28 in response to a both a leading edge of a system clock or a trailing edge of the system clock, as shown in FIG. 2. Thus, here the system clock 30 produces clock pulses at a predetermined clock rate CP. It is noted that system data from the system bus 12 is provided to the system memory 18 at a rate 2CP, that is at a rate twice the system clock rate CP. Thus, the read and write data words are provided on the memory data bus 28 at a rate twice the predetermined clock rate. The data passes between the CPU/system master 14 and the system memory 18 through the synchronizer 26. The synchronizer 26 has is connected to the write section 12W of the system bus 12 for write DDR data (i.e., data to be written in the system memory 18) and to the read section 12R of the system bus 12 for read DDR data, i.e., data read from the system memory 18. Here, the read data section 12R is 128 bits wide, the write data section 12W is also 128 bits wide, and the memory data bus 28 is 64 bits wide. The data appears on the read section 12R at a the system clock rate, CP, the data appears on the write section 12W at the system clock rate, CP, and the data appears in the memory data bus 18 at twice the system clock rate, i.e., at a rate 2CP, as described above. The synchronizer 26 is of any conventional design to provide the requisite bit length and speed synchronization between the system bus 12 and the memory bus 28.

The system 10 includes, as noted above, the trace buffer section 20. The trace buffer section 20 includes the dual port random access memory (DPR) 22. The dual port random access memory 22 is adapted to store two of the read and write data words fed concurrently to the pair of data ports (i.e., DATA_A and DATA_B) at two different locations in the dual port random access memory in response to the same edge of the system clock. The DPR 22 memory locations (i.e., addresses) are provided for the read data at port DATA_A on port ADDRESS_A and for the write data at port DATA_B on port ADDRESS_B. The fed data words are stored in the dual port random access memory at the predetermined system clock rate, CP. The trace buffer control system 24 couples read data words from the system memory 18 and provided on the read section 12R of the system bus 12 to one of the pair of ports, here port DATA_A, through an address and data read cycle controller (ADDR+DATA READ CYCLE CONTROLLER) 32 of system 24 and couples write data words provided on the write data section 12W of the system bus 12 to the other one of the pair of ports, here port DATA_B, of the dual port random access memory 22 through a through an address and data write cycle controller (ADDR+DATA WRITE CYCLE CONTROLLER) 34 of system 24. The read data words and write data words at the pair of ports are stored in the dual port random access memory at sequential locations thereof, such locations being provided by the address and data read cycle controller 32 and the address and data write cycle controller 24, respectively, as indicated in FIG. 1.

More particularly, the trace buffer control system 20 includes the address+data read control for read cycles (i.e., the ADDR+DATA READ CYCLE CONTROLLER 32) and the address+data control for write cycles (i.e., the ADDR+DATA WRITE CYCLE CONTROLLER 24). Each one of these controllers 32, 24 is a logic which receives a command from a DDR Trace Buffer controller 40 to then enable the DPR 22 to execute a write operation. The DDR Trace Buffer controller 40 allocates addresses in the DPR 22 and passes them to the ADDRESS+DATA READ CYCLE CONTROL-LER 32 for read data, and when the read data from DDR 18 is available the ADDRESS+DATA READ CYCLE CONTROLLER 32 issues a write command to DPR 22. Likewise, the DDR Trace Buffer controller 40 allocates addresses in the DPR 22 and passes them to the ADDRESS+DATA WRITE CYCLE CONTROLLER 24 for write data, and when the write data from DDR 18 is available the ADDRESS+DATA WRITE CYCLE CONTROLLER 24 issues a write command to DPR 22. Both "ADDRESS+DATA CONTROL FOR READ" and "ADDRESS+DATA CONTROL FOR WRITE" can be doing writes to DPR 22 at the same time. A "TRACE BUFFER CONTROL, DPR READ DATA AND CONTROL" bus 42 is used by the CPU/system master 14 to initialized the trace buffer section 20 and to read the content of the DPR 22 once the trace buffer section 20 is done recording. A "TRACE BUFFER COMMAND FROM DDR CONTROLLER" on bus 44 is a command from DDR SDRAM CONTROLLER 16 that indicates to the trace buffer section 20 that a write or read to DDR system memory 18 has started. The DATA_OUT is a read path so the CPU/system master 14 can read the content of the DPR 22 through the DDR trace buffer controller 40 via bus 42. As noted above, the control system 24 enables the dual port random access memory stored data to be retrieved from the dual port random access memory in the same sequence as such data was provided on the system data bus 12.

Referring now also to FIG. 2A, an example is shown. The system clock periods are indicated by T0, T1, T2, T3, T4, T5, T6, and T7. The system clock pulses are produced at a rate CP, here indicated as X. The memory clock pulses are produced at twice the system clock rate, 2CP, here indicated as 2X. Here, in this example, at the first system clock period T0, the CPU/system master 14 requests that READ DATA_1 be retrieved from the system memory 18. As will be described, the data read from the system memory 18 (READ DATA_1) will be provided on the system bus 12 at system clock time period T2, more particularly on the read section 12R (indicated as SYSTEM RD DATA BUS, in FIG. 2). Thus, during the system clock period T0, a read data command and system memory address (READ REQD1 in FIG. 2) are fed to the address/read/write/control of the system memory 18 during the first system clock period, T0, by the DDR SDRAM controller 16 (i.e., the SYSTEM COMMAND shown in FIG. 2), in response to a request from the CPU/system master 14.

During the latter phase of the second system clock period T1, i.e., in response to a memory system clock pulse, the data RAID DATA_1 is provided on the bi-directional memory data bus 28. Thus, during the system clock period T1, READ DATA_1 is pushed onto the memory bus 28 by the system memory 18.

During a subsequent system clock period, here during the third system clock period T2 in FIG. 2, the write data command and system memory address (WRITE REQ D2) are supplied by the controller 16 to the system memory 18. The data (WRITE DATA_2) to be written into the system memory is provided on the system bus 12, more particularly, on the write section 12W (SYSTEM WR DATA BUS), by the CPU/system master 14 at system clock period T2. Also, the READ DATA_1 is provided on the system data bus 12, more particularly on the read section 12R (SYSTEM RD DATA BUS). Thus, during the system clock period T2, the CPU/system master 14 performs a WRITE DATA_2 operation, WRITE DATA_2 is pushed onto the system bus 12, more particularly on the write section 12W, and READ DATA_1 is pushed onto the system data bus 12, more particularly on the read section 12R by the synchronizer 26.

Next, during the fourth system clock period T3, a read data command and system memory address (READ REQ D3) are supplied by the controller 16 to the system memory 18. As will be described, the data read from the system memory 18 (READ DATA_3) will be provided on the system bus 12, more particularly on the read section 12R during the sixth system clock pulse, T5. During the first phase of this system clock period T3, and in response to the memory clock pulse, the data WRITE DATA_2 is provided on the memory bus 28. Also, the READ DATA_1 and the WRITE DATA_2 are provided to ports DATA_A and DATA_B, respectively of the dual port random access memory 22. Thus, during the system clock period T3, the CPU/system master 14 requests READ DATA_3. Also, WRITE DATA_2 is pushed onto memory bus 28 by synchronizer 26, an address and control signal for a read cycle is fed to the DPR 22 to write therein the READ DATA_1 at port DATA_A, such data being written into the next sequential location (LOC Y) of the DPR 22, and concurrently therewith an address and control signal for a write cycle is fed to the DPR 22 to write therein the WRITE DATA_2 at port DATA_B, such data being written into the next sequential location (LOC Y+2) of the DPR 22.

During the later phase of the system clock period, T4, i.e., in response to a memory system clock pulse, the data READ DATA_3 is provided on the bi-directional memory data bus 28. Thus, during the system clock period T4, READ DATA_3 is pushed onto the memory bus 28 by the system memory 18.

During the system clock period T5, a write data command and system memory address (WRITE REQ D4) are supplied by the controller 16 to the system memory 18. The data (WRITE DATA_4) to be written into the system memory 18 is provided on the system bus 12, more particularly, on the write section 12W (SYSTEM WR DATA BUS), by the CPU/system master 14 at system clock period T5. Also, the READ DATA_3 is provided on the system data bus 12, more particularly on the read section 12R (SYSTEM RD DATA BUS). Thus, during the system clock period T4, READ DATA_3 is pushed onto the memory bus 28 by the system memory 18. Thus, during the system clock period T5, the CPU/system master 14 performs a WRITE DATA_4 operation, WRITE DATA_4 is pushed onto the system bus 12, and READ DATA_3 is pushed onto the system data bus 12 by the synchronizer 26.

Next, during the first phase of the seventh system clock period T6, the WRITE DATA_4 is provided on the memory bus 28 in response to a memory clock pulse. Also, during the system clock period T6, the READ DATA_3 and the WRITE DATA_4 are provided to ports DATA_A and DATA_B, respectively of the dual port random access memory 22. Thus, during the system clock period T6, WRITE DATA_4 is pushed onto memory bus 28 by synchronizer 26, an address and control signal for a read cycle is fed to the DPR 22 to write therein the READ DATA_3 at port DATA_A, such data being written into the next sequential location (LOC Y+3) of the DPR 22, and concurrently therewith an address and control signal for a write cycle is fed to the DPR 22 to write therein the WRITE DATA_4 at port DATA_B, such data being written into the next sequential location (LOC Y+4) of the DPR 22.

Thus, at the end of the system clock period T6, the data READ DATA_1, WRITE DATA_2, READ DATA_3, and WRITE DATA_4 are stored in sequential locations, LOC Y, LOC Y+1, LOC Y+2, and LOC Y+3, respectively of the DPR 22, as shown in FIG. 3. As noted above, the control system 24 enables the dual port random access memory stored data to be retrieved from the dual port random access memory in the same sequence as such data was provided on the system data bus 12.

A number of embodiments of the invention have been described. Nevertheless, it will be understood that various modifications may be made without departing from the spirit and scope of the invention. Accordingly, other embodiments are within the scope of the following claims.

What is claimed is:

1. A system, comprising:
   a system memory;
   a system data bus for providing, in a sequence, read data words retrieved from the system memory and write data words for storage in such system memory, such read data words and write data words being provided on the system data bus at a predetermined system clock rate;
   a memory data bus connected to the system memory;
   a system memory controller for enabling the system memory to store therein the write data words on the memory data bus at a rate twice the system clock rate and for enabling read data words stored in the system memory to be retrieved therefrom and provided on the memory data bus at twice the system clock rate;
   a synchronizer, coupled between the system data bus and the memory data bus, for enabling the read data words retrieved from the system memory at a rate twice the system clock rate to be provided on the system data bus at the system clock rate and for enable write data words provided on the system data bus at the system clock rate to be provided on the memory data bus at twice the system clock rate;
   a trace buffer section comprising:
      a dual port random access memory having a pair of data ports, such dual port being adapted to store two of the read and write data words provided on the system data bus at the system clock rate and fed concurrently to the pair of data ports into two different memory locations of the dual port random access memory for storage therein at the predetermined system clock rate; and
      a trace buffer control system for coupling the read data words provided on the system data bus to one of the pair of ports and for coupling the write data words provided on the system data bus to the other one of the pair of ports, for controlling the dual port random access memory to enable storage of the read data words and write data words fed to the pair of data ports in the different memory locations, and for enabling such dual port random access memory stored read data words and write data words to be retrieved from memory locations of the dual port random access memory in the same sequence as such read data words and write data words were provided on the system data bus.

2. A system comprising:
   a system memory coupled to a memory data bus, such system memory being adapted to store therein write data words provided on the memory data bus, or have read data words stored therein read therefrom provided on the memory data bus, such read data words and such write data words being provided in a sequence on the memory data bus, such system memory being adapted to store the write data words provided on the memory data bus and to provide the read data words on the memory data bus in response to a both a leading edge of a system clock or a trailing edge of the system clock, such system clock having a predetermined clock rate, wherein such read and write data words are provided on the memory data bus at a rate twice the predetermined clock rate;

a trace buffer, comprising:

a dual port random access memory having a pair of data ports, such dual port random access memory being adapted to store two of the read and write data words fed concurrently to the pair of data ports at two different locations in the dual port random access memory in response to the same edge of the system clock, such fed data words being stored in the dual port random access memory at the predetermined clock rate;

a trace buffer control system for coupling read data words from the system memory and provided on the memory data bus to one of the pair of ports of the dual port random access memory and for coupling write data words to be stored in the system memory and provided on the memory data bus to the other one of the pair of ports of the dual port random access memory, such read data words and write data words at the pair of ports being stored in the dual port random access memory at sequential locations thereof, such read data words and such write data words being retrievable from the dual port random access memory in the same sequence as such read data words and write data words were provided on the data bus.

3. A system, comprising:

a system memory coupled to a memory data bus, such system memory being adapted to store therein write data words provided on the memory data bus, or have read data words stored therein read therefrom provided on the memory data bus at a rate twice a predetermined system clock rate, such read data words and such write data words being provided on a sequence on the memory data bus;

a trace buffer, comprising:

a dual port random access memory having a pair of data ports, such dual port random access memory being adapted to store two of the read and write data words fed concurrently to the pair of data ports at two different locations in the dual port random access memory for storage therein at the predetermined system clock rate;

a trace buffer control system for coupling read data words from the system memory to one of the pair of ports and for coupling write data words to be stored in the system memory to the other one of the pair of ports, such read data words and such write data words being retrievable from the dual port random access memory in the same sequence as such read data words and write data words were provided on the data bus.

* * * * *